United States Patent [19]

Yamamoto et al.

[11] 4,414,575
[45] Nov. 8, 1983

[54] AUTOFOCUS SYSTEM

[75] Inventors: Manabu Yamamoto, Odawara; Shuhei Tanaka, Musashimurayama, both of Japan

[73] Assignee: Hitachi Denshi Kabushiki Kaisha, Tokyo, Japan

[21] Appl. No.: 322,704

[22] Filed: Nov. 18, 1981

[30] Foreign Application Priority Data

Nov. 21, 1980 [JP] Japan .................. 55-163340
Dec. 17, 1980 [JP] Japan .................. 55-178194
Dec. 17, 1980 [JP] Japan .................. 55-178598

[51] Int. Cl.³ ............................... H04N 9/28
[52] U.S. Cl. ................................... 358/227
[58] Field of Search ................ 358/225, 226, 227

[56] References Cited

U.S. PATENT DOCUMENTS 4,301,478 11/1981 Sakane .................. 358/227
4,333,716 6/1982 Sakane .................. 358/227

FOREIGN PATENT DOCUMENTS 39-5265 4/1964 Japan .

Primary Examiner—Michael A. Masinick
Attorney, Agent, or Firm—Blakely, Sokoloff, Taylor & Zafman

[57] ABSTRACT

In an autofocus system in which the image definition of an object to be picked up is detected by image sensor means disposed on a light path of an image-forming optical system and converted into electric signals, and the image-forming position of the image-forming optical system is controlled by using the electric signals, a plurality of electric signals representative of image definitions are obtained from a main image sensor and at least one sub-image sensor which are provided at optically different positions on the light path and subjected to a predetermined logical judgement processing to produce a focus control signal. The position of the image-forming optical system is controlled by the focus control signal. When the sub-image sensor is movably supported and the light path length between the image-forming optical system and the sub-image sensor is varied by changing the position of the sub-image sensor, a signal representative of the position of the sub-image sensor is also subjected to a predetermined logical judgement processing and used for controlling the position of the sub-image sensor.

5 Claims, 15 Drawing Figures

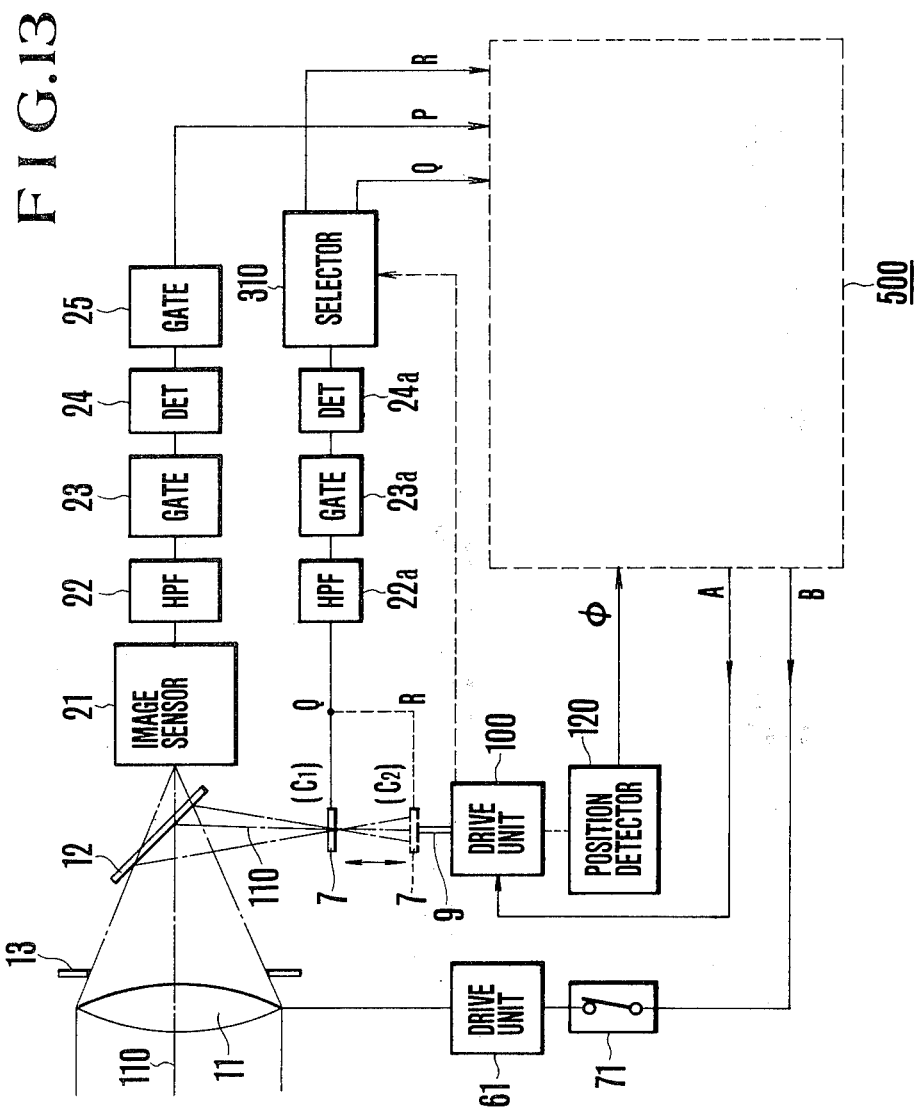

AUTOFOCUS SYSTEM

BACKGROUND OF THE INVENTION

This invention relates to an autofocus system directed mainly to cameras, such as television cameras, which incorporate photoelectric conversion image sensors. The expression "autofocus" as used herein shall mean the function of an optical adjustment for automatically focussing images in an image-forming optical system without any recourse to human eyes.

The techniques heretofore known to the art as means for autofocus are basically classified as follows:
(a) Image definition detecting type The definition of an image formed on the imaging plane or at a position optically equivalent to the imaging plane is detected and the image-forming optical system is adjusted in accordance with the resulting detection signal. As the signal for indicating the definition of the image, there may be used the value of differential of the image signal, the amplitude of the high-frequency component of the image signal, or the difference between the maximum and minimum values of the amplitude of the image signal. The techniques involving these signals are well known in the field of image processing.
(b) Distance measuring type The distance from the image-forming system (such as a lens) to the object is detected by a suitable method such as triangulation and the image-forming optical system is adjusted on the basis of this distance signal.

In the two types described above, the image definition detecting type is adopted in the system of the present invention. The reason for the choice of this type is (1) that for the focussing which is primarily aimed at obtaining a clear image of a given object, the detection of the image definition is most rational, and (2) that the distance measuring type tends to degradation in the accuracy of distance measurement with respect to objects at great distances or of cyclically repeating patterns.

FIG. 1 illustrates a conventionally known image definition detection type focussing system in a television camera. Such a system is disclosed in Japanese patent publication No. 5265/'64, for example. By a camera lens 11, the image of a given object is formed on an imaging plane of a camera tube of solid state image sensor plate 21 (hereinafter referred to as "image sensor"). The video signal output from the image sensor 21 is passed through a high-pass filter 22 capable of selectively passing a high-frequency signal component, a detector 27, and a signal processor 28 and applied to a driving power source 29. By the output from the driving power source 29, a drive unit 61 moves the lens 11.

The operating principle of this conventional system is as follows. When the image is correctly focussed, the image definition is maximized and, consequently, the high-pass component of the video signal is also maximized. Therefore, the focussing of the image is obtained by passing the output from the high-pass filter 22 through the detector 27 thereby measuring the amplitude of the output, and moving the lens so as to maximize the amplitude while judging the variation of the amplitude due to the movement of the lens by means of the signal processor 28.

The fault found with this conventional system is that when the position of the lens 11 is greatly separated from the correct focus position, namely when the image is blurred under heavy out-focus conditions, the amplitude of the high-pass component of the video signal becomes so small and the variation of the amplitude due to a small movement of the lens 11 also becomes so small that the out-focus signal cannot be supplied to the signal processor 28. This conventional system has another disadvantage that the system itself fails to follow a rapid movement of the object or the camera.

SUMMARY OF THE INVENTION

An object of this invention is to provide a focussing system which can overcome the aforementioned difficulties suffered by the conventional technique, fulfil the focussing function even under heavy out-focus conditions, and promptly follow the movement of the object or the camera.

To accomplish this object, the focussing system of the present invention is based on a novel principle. Namely, the autofocus is accomplished by obtaining a plurality of image definition signals from a main image sensor and one or more sub-image sensors disposed at different positions on the light path in an image-forming optical system, subjecting these signals to a specific logical judgement processing thereby producing a focus control signal, and controlling the lens position in accordance with the focus control signal.

BRIEF DESCRIPTION OF THE DRAWINGS

FIG. 13 is a block diagram showing still another embodiment in which only one sub-image sensor is used.

DESCRIPTION OF PREFERRED EMBODIMENTS

Figure 1:
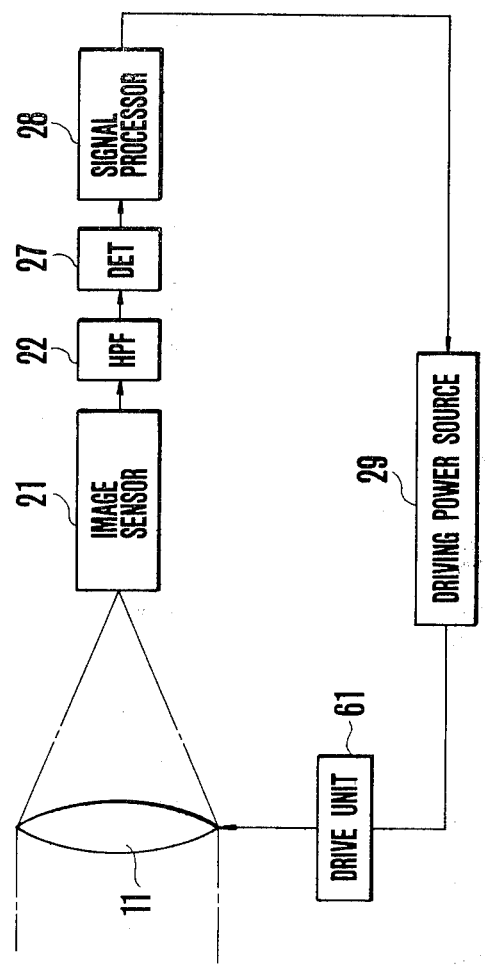
FIG. 1 is a block diagram showing a conventional autofocus system.
Figure 2:
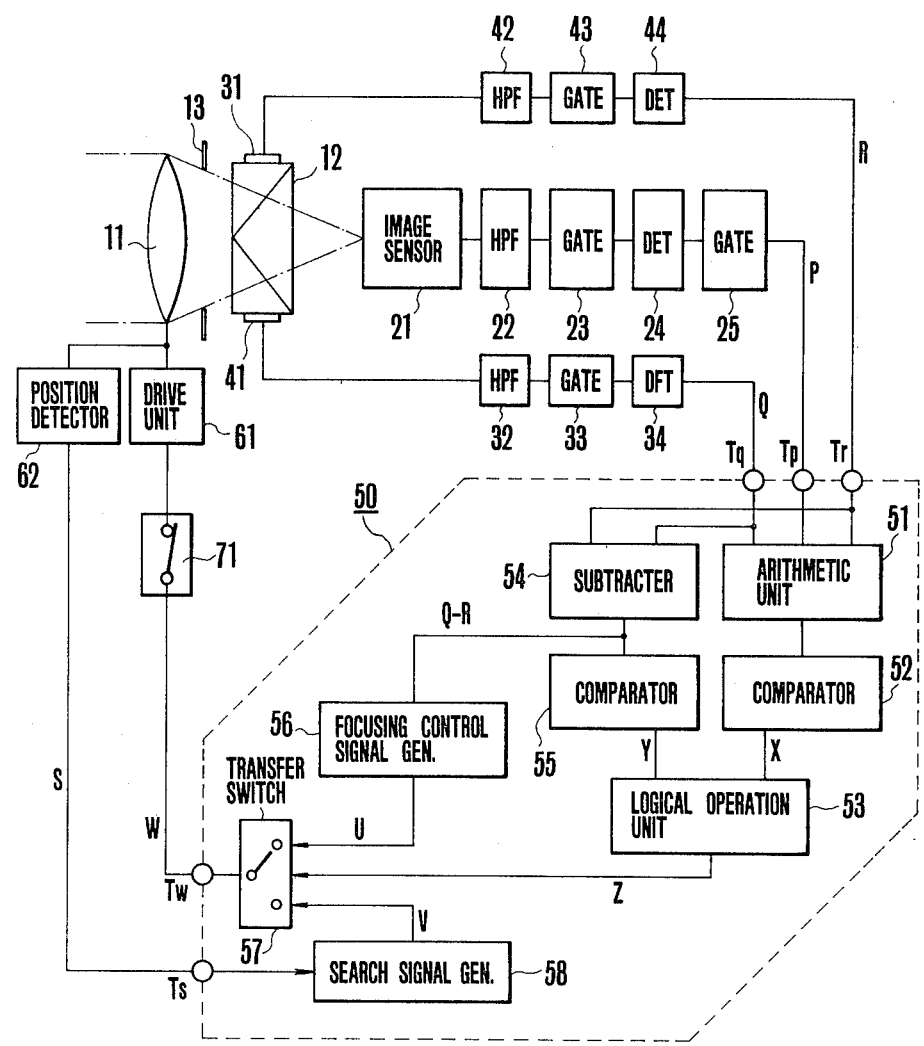
FIG. 2 is a block diagram showing one embodiment of an autofocus system of the present invention.

Reference is made to FIG. 2 which illustrates a preferred embodiment of an autofocus system according to the invention. As shown, the image of an object is focussed by a camera lens 11 on an image sensor 21 and, at the same time, it is projected on the other two image sensors 31, 41 through the medium of a beam splitter 12. The amount of light which impinges upon these image sensors is regulated by an aperture 13. The image sensor 21 constitutes a main image sensor of the video camera. Part of the two-dimensional video signal generated from the main image sensor is utilized as the autofocus signal. The two image sensors 31, 41 constitute sub-image sensors for generating autofocus signals. A one-dimensional image sensor consisting of a multiplicity of minute solid state photoelectric sensor elements arrayed in line will serve advantageously for this purpose. The image sensors 31, 41 are disposed so that when the image of the object is correctly focussed on the main image sensor 21, the sub-image sensor 31 assumes a position closer to the lens 11 than the main image sensor by a predetermined length of light path and the sub-image sensor 41 assumes a position farther from the lens 11 than the main image sensor by substantially the same length of light path as the predetermined length. These three image sensors 21, 31, and 41 are scanned synchronously. In other words, the sub-image sensors 31, 41 are synchronously scanned at the same time that the main image sensor 21 scans a specified horizontal scanning line and hence three video signals obtained at that time correspond to the same part of the object being photographed.

To the three image sensors 21, 31, and 41, are respectively connected high-pass filters 22, 32, and 42. The amplitude of the high-frequency component of the video signal varies with the degree of image definition and reaches its maximum when the image is correctly focussed. Therefore, this invention utilizes the amplitude of the high-frequency component of the video signal as the signal indicating the degree of image definition. In this case, the high-frequency switching noise which is generated when the solid state photo-electric sensor elements are driven can be eliminated by means of a filter or gate. Optionally, the high-pass component may be emphasized by subjecting the video signal to differentiation.

The outputs from the high-pass filters 22, 32, and 42 are coupled to gates 23, 33, and 43. These gates each serve to extract from one horizontal scanning line a specified portion and consequently the image screen is limited in the horizontal direction and a specified portion of the object in the image screen is focussed. The outputs from the gates 23, 33, and 34 are coupled to detectors 23, 34, and 44. The outputs from the detectors 24, 34, and 44 constitute DC signals corresponding to the peak values of the amplitudes of the high-frequency components of the video signals. Since the main image sensor 21 is a two-dimensional image sensor and its peak value is produced from the detector 24 for each horizontal scanning line, the gate 25 extracts from the peak value just one specified horizontal line that is synchronized with the sub-image sensors 31, 41.

Now, let P stand for the peak value obtained from the main image sensor and Q and R for the peak values obtained respectively from the sub-image sensors 31, 41. These signals are applied to a controller 50 via input terminals $T_p$, $T_q$, and $T_r$. The output from the controller 50 apears at a terminal $T_w$. This voltage is represented by W. By this signal W, the lens 11 is driven through the medium of a drive unit 61. The position of the lens 11 is detected by a position detector 62 and the detected signal is applied via an input terminal $T_s$ to the controller 50. Optionally, the movement of the lens 11 by the drive unit 61 may be stopped by means of a manual switch 71.

Now, the construction and operation of the controller 50 will be described. The peak values P, Q, and R are normalized as follows. They are so adjusted that $Q_o = R_o$ and $P_o \simeq Q_o$ are satisfied wherein $P_o$ stands for the value of P when the image of the object is focussed on the image sensor 21, $Q_o$ for the value of Q when the image is focussed on the image sensor 31, and $R_o$ for the value of R when the image is focussed on the image sensor 41. By an arithmetic unit 51, P, Q, and R are converted into a function $F(P, Q, R) \equiv (P-Q)^2 + (P-R)^2$, and this function is examined by a comparator 52 to determine whether or not the following is satisfied:

$$F(P, Q, R) \equiv (P-Q)^2 + (P-R)^2 > a \qquad (1)$$

In the formula, a denotes a reference voltage, the value of which is fixed so as to be greater than the noise levels included in the signals P, Q, and R but smaller than the aforementioned values $P_o$, $Q_o$, and $R_o$. Since the focussing peak values $P_o$, $Q_o$, and $R_o$ are variable with the contrast of the object, it is desired to have the value of "a" to be set on the basis of the object of a relatively low contrast. Optionally, the value of "a" may be varied in accordance with the amplitude of the video signal.

The output X from the comparator 52 assumes a high voltage level (hereinafter represented as H) when the condition of formula (1) is satisfied, and it assumes a low voltage level (hereinafter represented as L) when the condition is not satisfied, namely when $F(P, Q, R) \leq a$ is satisfied. This output X is applied to a logical operation unit 53.

On the other hand, Q and R are fed to a subtracter 54, which issues the difference signal Q−R as its output. The signal Q−R is coupled to a comparator 55 and examined as to whether or not it satisfies the following condition.

$$\Delta(Q, R) = |Q-R| > b \qquad (2)$$

In this formula, b stands for a reference voltage which is set so as to be greater than the noises included in the signals Q, R. Since this value is far smaller than the peak values $Q_o$, $R_o$, the condition of formula (2) is practically equivalent to the judgement of the fact that $Q \neq R$, namely, Q and R are different.

Output Y from the comparator 55 assumes the value of H when the condition of formula (2) is satisfied, and it assumes the value of L when $\Delta(Q, R) \leq b$ or $Q \simeq R$ is satisfied. This output Y is fed to the logical operation unit 53. The relation of the inputs X, Y to the logical operation unit 53 and the output Z from the same unit is shown in Table 1.

TABLE 1

|  | state | | | |
| --- | --- | --- | --- | --- |
|  | I | II | III | IV |
| Input | F > a | F > a | F ≦ a | F ≦ a |
| output | Δ > b | Δ ≦ b | Δ > b | Δ ≦ b |
| Input X | H | H | L | L |
| Input Y | H | L | H | L |
| Output Z | H | H | H | L |

It is clear from Table 1 that Z=L occurs only in the state IV, namely, when $F(P, Q, R) \equiv (P-Q)^2 + (P-R)^2 \leq a$ and $\Delta(Q, R) \leq b$ or $Q \simeq R$ are satisfied and Z=H occurs in all the other states I, II, and III.

The output Q−R from the subtracter 54 is also fed to a focussing control signal generator 56 and focus control signal $U=f(Q-R)$ is issued as the output. The simplest form of the function $f(Q-R)$ is the proportional relation represented as follows:

$$U=c(Q-R) \tag{3}$$

In this equation, c stands for the coefficient of proportion. The value of this coefficient is adjusted so that the output voltage U will suffice for driving the drive unit 61.

Actually, for the purpose of preventing the output voltage U from assuming an excessively large value, it is desirable to provide the focussing control signal generator 56 with a saturation characteristic such that the output U is proportional to the difference $Q-R$ in accordance with equation (3) when the absolute value of $|Q-R|$ is relatively small, whereas the output U is saturated to a fixed value when the absolute value of $|Q-R|$ is larger. The sign of U is identical with that of $Q-R$. When $U>0$ occurs, the lens 11 is withdrawn and brought closer toward the image sensor 21. When $U<0$ occurs, the lens 11 is pushed out and separated from the image sensor 21. The lens 11 remains at rest when $U=0$ lasts.

The output Z from the logical operation unit 53 and the output U from the focussing control signal generator 56 are fed to a transfer switch 57. To the transfer switch 57 is also fed output V from a search generator 58. The search signal V is in the form of a fixed positive or negative voltage. The polarity of this search signal V is controlled by signal S which is generated by the lens position detector 62.

The transfer switch 57 functions as follows. The connection between the terminals is changed by the signal level of the input Z. When $Z=H$ occurs, the output terminal $T_w$ is connected to the input terminal of the focussing control signal U to satisfy $W=U$. When $Z=L$ occurs, the output terminal $T_w$ is connected to the input terminal of the search signal V to satisfy $W=V$.

Now, the operation of the focussing system of the present invention will be described. First, the equivalent positional relation between the lens 11, the point of image formation, and the three image sensors 21, 31, and 41 will be described with reference to FIG. 3. When the lens 11 is pushed out farthest forward and brought to a position 11A, the object at the nearest distance is focussed on the image sensor 21 and the object at the infinite distance is focussed at a point M. When the lens 11 is moved to a position 11B the object at the infinite distance is focussed on the image sensor 21 and that at the nearest distance at a point N. From this relation, it is clear that generally all the objects falling within the nearest distance to the infinite distance are focussed at points falling between the points M and N irrespective of the position of the lens 11.

Let us assume that the image of one object is focussed correctly on the image sensor 21. In this case, the signal P assumes the maximum value and $Q=R<P$ is satisfied. Consequently, $F(P, Q, R)\equiv(P-Q)^2+(P-R)^2>a$ is satisfied. In other words, $X=H$ and $Q-R=O$, namely, $Y-L$ are satisfied, and the state II of Table 1 is materialized.

Therefore, the following relations are satisfied.

$$\left.\begin{array}{l}Z = H \\ W = U = c(Q - R) = O\end{array}\right\} \tag{4}$$

The lens 11, therefore, continues to remain at the focussed position.

It is now assumed that the image of the object deviates and focusses near the image sensor 31. Then $$Q>P>R \tag{5}$$

is satisfied and therefore, $F(P, Q, R)\equiv(P-Q)^2+(P-R)^2>a$, namely, $X=H$, is satisfied and $Q-R\neq0$, namely $Y=H$, is also satisfied. Thus, the state I of Table 1 is realized. Consequently, the following relations are satisfied.

$$\left.\begin{array}{l}Z = H \\ W = U = c(Q - R) > O\end{array}\right\} \tag{6}$$

Figure 3:
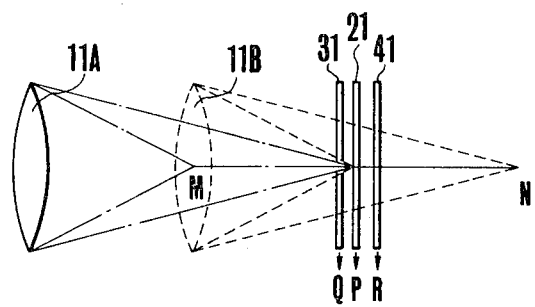
FIG. 3 is a schematic diagram of an optical system to be used for explaining the operating principle of the system according to the present invention.

The lens 11 in FIG. 3 is moved to the right and brought to a stop when the image of the object is correctly focussed on the image sensor 21. When the focus conversely deviates to the vicinity of the image sensor 41 and $U<0$ consequently results, the lens is brought backward to the correct focus.

It is now assumed that the focus heavily deviates to the left and falls in the neighborhood of the point M. This situation represents the condition in which the lens 11 is pushed out farthest and the object is positioned at the infinite distance. In this case, the images formed at the three image sensors 21, 31, and 41 are all blurred heavily. The high-frequency components obtained from all these image sensors are vary small and thus $P\simeq Q\simeq r\simeq O$ stands. Consequently, $F(P, Q, R)\equiv(P-Q)^2+(P-R)^2<a$, namely $X=L$, is satisfied and $Q-R\simeq 0$, namely $Y=L$, is also satisfied. Thus, the state IV of Table 1 is realized. Consequently, the following relations are satisfied.

$$\left.\begin{array}{l}Z = L \\ W = V\end{array}\right\} \tag{7}$$

The lens 11, accordingly, is driven by the output V of the search signal generator 58. Incidentally, the signal V assumes a fixed positive or negative value. If the polarity of the signal V happens to be plus, then the lens 11 is drawn in to the right in the diagram of FIG. 3 and eventually brought to the infinite terminal. At this point, a position detector 62 is actuated to issue a signal to the search signal generator 58 to reverse the polarity of the output. In response to the signal, the drive unit 61 begins to rotate in the opposite direction to push the lens 11 to the left in the diagram of FIG. 3. When the lens 11 reaches the nearest terminal, the position detector 62 issues a signal to reverse the direction of the movement of the lens. Actually, during such a movement of the lens 11, the focus approaches the image sensor 31 or 41 to satisfy simultaneously the two conditions, $F(P, Q, R)\equiv(P-Q)^2+(P-R)^2>a$ and $Q-R\neq O$ and, consequently, realize the state I of Table 1. Since $Z=H$ and $W=U$ are both satisfied, the automatic control is actuated to drawn in the lens 11 to the correct position of focus.

when the object being picked up has low contrast or when the focal depth of the lens 11 is large, it can happen that $F(P, Q, R)\equiv(P-Q)^2+(P-R)^2\simeq O$ and $P\simeq Q$ are satisfied irrespective of the position of the lens. In such a case, $W=V$ is always held and the lens 11 repeats alternate forward and rearward movements infinitely. This can be avoided by manually turning off the switch 71 and stopping the movement of the lens 11 when the lens 11 is on the verge of reaching the focal position.

Even when the focal point notably deviates from the image sensors 21, 31, and 41 so much as to satisfy F(P, Q, R)≡(P−Q)²+(P−R)²≦a, Z=H and W=U are satisfied and the autofocus function is fulfilled so far as |Q−R|>b continues to exist. This situation corresponds to the state III of Table 1.

Figure 4:
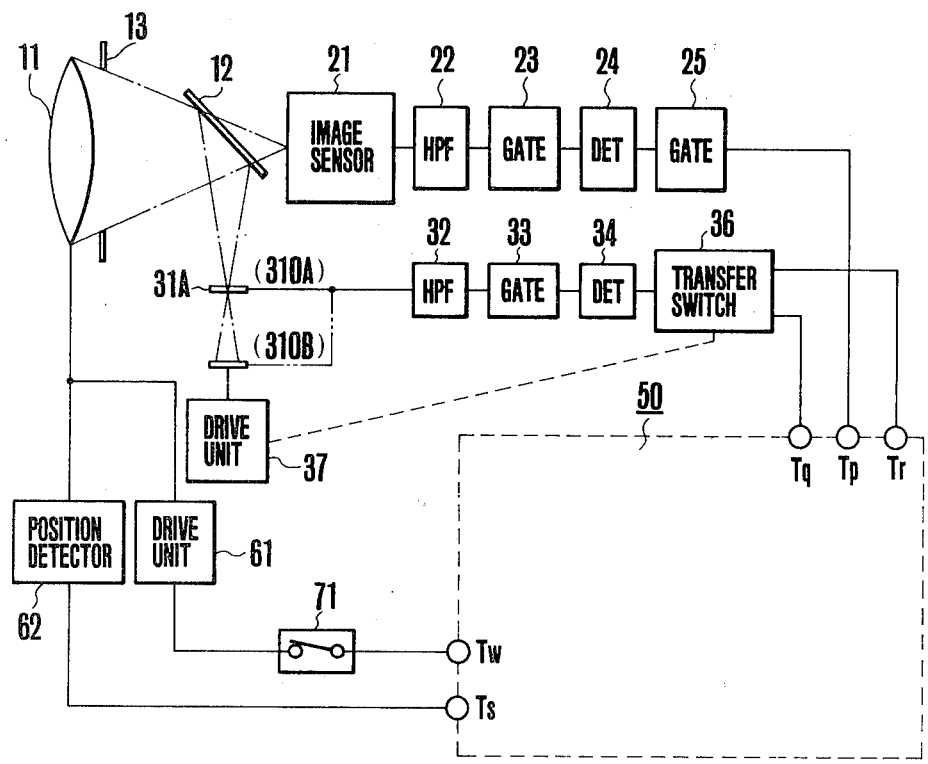
FIGS. 4, 5, and 6 are block diagrams showing modified embodiments of the present invention.

FIG. 4 illustrates another embodiment of the present invention. Different from the foregoing embodiment so far described which uses two sub-image sensors, this embodiment uses a single sub-image sensor 31A. The sub-image sensor 31A is driven in the direction of the optical axis by a drive unit 37 to make a reciprocating movement between a forward position 310A and a rearward position 310B. Let Q stand for the peak value of the high-frequency component of the video signal generated at the forward position and R for that generated at the rearward position respectively, they correspond respectively to the Q and R of the foregoing embodiment. The peak value of the high-frequency component of the video signal generated from a main image sensor 21 is P similarly to that involved in the foregoing embodiment. In the foregoing embodiment, the signal representative of the degree of image definition is obtained from two stationary sub-image sensors. In contrast, in this embodiment, the signal representative of the degree of image definition is obtained in time series by sequentially moving the single sub-image sensor to varying positions on the optical axis.

The signal obtained from the main image sensor 21 is fed to an input terminal $T_p$ of a controller 50. The signal obtained from the sub-image sensor 31A is fed to a transfer switch 36 which is operating synchronously with the drive unit 37. Thus, the signal at the forward position is coupled to an input terminal $T_q$ and that at the rearward position to an input terminal $T_r$. The subsequent processing of all these signals is similar to that of the foregoing embodiment.

The embodiments set forth above admit the following modifications.

(1) Image sensor

This system requires a plurality of sub-image sensors for generating video signals at the positions forward and rearward of the main image sensor. Alternatively, the forward and rearward signals may be alternately generated in time series by causing a single sub-image sensor to move spatially. In the former case, two sub-image sensors are disposed at the positions separated by different lengths of light path from the lens. Then, it is most desirable for the main image sensor to be disposed in the middle of the two sub-image sensors. In this arrangement, the main image sensor comes to occupy the correct focal position automatically when the condition of Q=R is satisfied. When the position of the main image sensor deviates from the exact middle point between the two sub-image sensors, the condition of Q=R can be made to occur at the focal point of the main image sensor by adjusting the gains of the electronic circuits connected to the two sub-image sensors so that the electronic circuit connected to one sub-image sensor separated by a smaller distance from the main image sensor will have a lower gain and the electronic circuit connected to the other sub-image sensor separated by a larger distance will have a higher gain.

(2) Logical processor

The functional equation, $$F(P, Q, R) \equiv (P-Q)^2 + (P-R)^2 \tag{8}$$

may as well be considered as representing the degree of disagreement between the signals Q and R of the two sub-image sensors and the signal P of the main image sensor. The face that the value of F is large signifies that the focal point of the lens is close to the correct focus, namely, the main image sensor. In this case, more accurate focussing is effected by controlling the position of the lens by the focussing control signal U. Conversely the fact that the value of F is small signifies that the position of the image formed by the lens is separated by a large distance from the main image sensor. In this case, the lens is first driven by the search signal V and subsequently adjusted accurately to the correct position by means of the control signal U.

As described above, the position of the image focussed by the lens is indicated by the value of the function F(P, Q, R) and the drive signal for the lens is selected based on the result.

For simpler detection of the position of the lens, another functional equation shown below may be used.

$$G(P, Q, R) \equiv \alpha P + \beta Q + \gamma R \tag{9}$$

In this formula, $\alpha$, $\beta$, and $\gamma$ are constants. This function G has a nature of approaching its peak value in the neighborhood of the correct focal point and gradually dwindling to zero with the increasing distance from the focal point. When the gains of the relevant circuits are adjusted so as to satisfy $\alpha = \beta = \gamma = 1$, the following functional equation is satisfied.

$$G(P, Q, R) = P + Q + R \tag{10}$$

The function G(P, Q, R) is useful where the peak values of P, Q, and R involve small time-course changes.

Where the function G(P, Q, R) given by the formula (8) or the formula (9) indicated above is used, the calculation of the function is carried out by the arithmetic unit 51 mentioned above.

When the function G is used in place of the function F, the state II of Table 1 is always realized and the focussed state is retained irrespective of the position of the lens if the focal depth of the lens is large.

In the foregoing embodiments, the one-dimensional solid state image sensor is used as the sub-image sensor. But, as means for the detection of the image definition, many other techniques have been known in the art. Any of such known techniques may be adapted for the sub-image sensor in the system of the present invention. For example, a slit or spatial filter is disposed in front of the photoelectric conversion element and scanned; for alternatively, the property of the photoelectric element assuming the maximum value of resistance at the focal point owing to the non-linear response characteristic of the element may be adapted for the sub-image sensor for the system of this invention. In further alternative, the beam of light from a light-emitting diode is directed toward an object being photographed and the light scattered by the object is received.

This invention is characterized by using as logical inputs the signals representative of the degrees of image definition obtained by the main and sub-image sensors, performing a specific logical operation on the inputs, and controlling the position of the lens in accordance with the outputs of the logical operation. By this method, the lens is always drawn in to the correct focussed position irrespective of the distance, contrast, and movement of the object. Optionally, part of the main image sensor may be concurrently used as the sub-image sensor. The reason for this concurrent use of the main image sensor is as follows. Generally, the photosensing surface of the image sensor has some tolerance in its peripheral portion. This marginal portion, though capable of functioning as the image sensor, is neither scanned nor reflected on the image screen to be actually observed. This marginal portion exists in the vertical or horizontal edges of the image plane and it can be utilized effectively as the sub-image sensor. In this case, it naturally becomes necessary to provide means for shielding light so as to prevent the main image from being projected on the portion serving as the sub-image sensor. If the portion thus utilized happens to be what remains unscanned in the normal condition, it becomes necessary to confer the function of sub-image sensor upon that portion by separately scanning that portion during the fly-back time.

Figure 5:
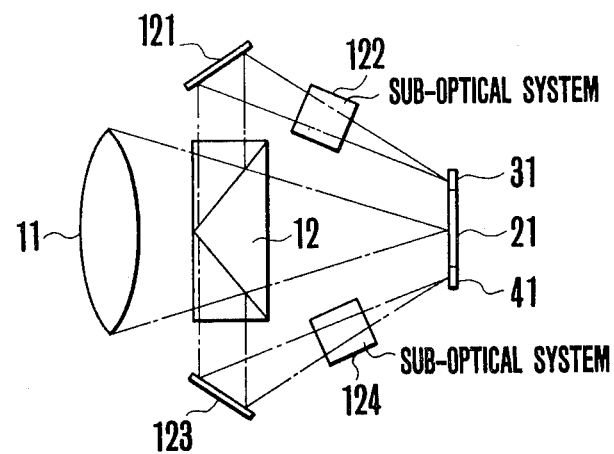

FIG. 5 depicts a modification in which the peripheral portion of a main image sensor is concurrently used as sub-image sensors. Part of the light separated by a beam splitter 12 advances via a reflecting mirror 121 and a sub-optical system 122 and forms an image on a first sub-image sensor 31 which constitutes the peripheral part of a main image sensor 21. This sub-image sensor is disposed at a forward position relative to the main image sensor 21. Another part of the light which has been separated by the beam splitter 12 advances via a reflecting mirror 123 and a sub-optical system 124 and forms an image on a second sub-image sensor 41 which constitutes a different part from the aforementioned sub-image sensor 31 in the periphery of the main image sensor 21. This sub-image sensor 41 is disposed at a rearward position relative to the main image sensor 21. With respect to the other components than those described above, the present embodiment is identical with that of either of the foregoing embodiments above and the operation thereof will not be described herein.

Figure 6:
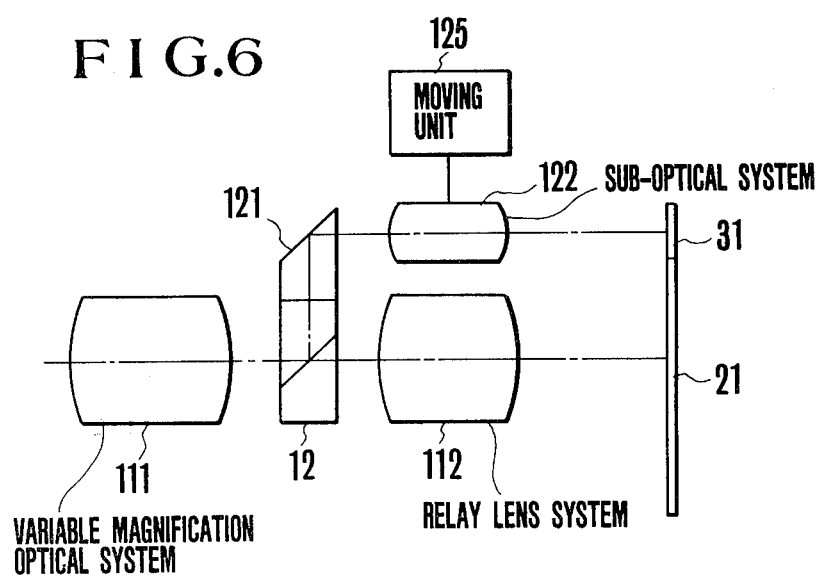

FIG. 6 depicts still another modification wherein the peripheral portion of a main image sensor is utilized as a sub-image sensor. This modification is exemplified as a case wherein a zoom lens serves as image-forming optical system. This zoom lens is composed of a variable magnification optical system 111 and a relay lens system 112, with a beam splitter 12 interposed between the two systems. The light which has been separated by the beam splitter 12 advances via a reflecting surface 121 and a sub-optical system 122 and forms an image on a sub-image sensor 31 which constitutes the peripheral portion of a main image sensor 21. By reciprocating a component lens of the sub-optical system 122 by means of a moving unit 125, the image formed on the sub-image sensor 31 is caused to reciprocate between the forward and rearward focussed states. In this modification, the control of the distance of the sub-image sensor is accomplished by regulating the amplitude of the reciprocating movement of the component lens of the sub-optical system 122. And, the position signal of the sub-image sensor indicates the position of the lens.

With respect to all the other components than those described above, this modification is identical with that of any of the foregoing embodiments and will not be described herein.

In the modification of FIG. 5 or FIG. 6, the focussing may be accomplished by having the image sensors 21, 31, and 41 integrally moved instead of moving the lens.

Figure 7A:
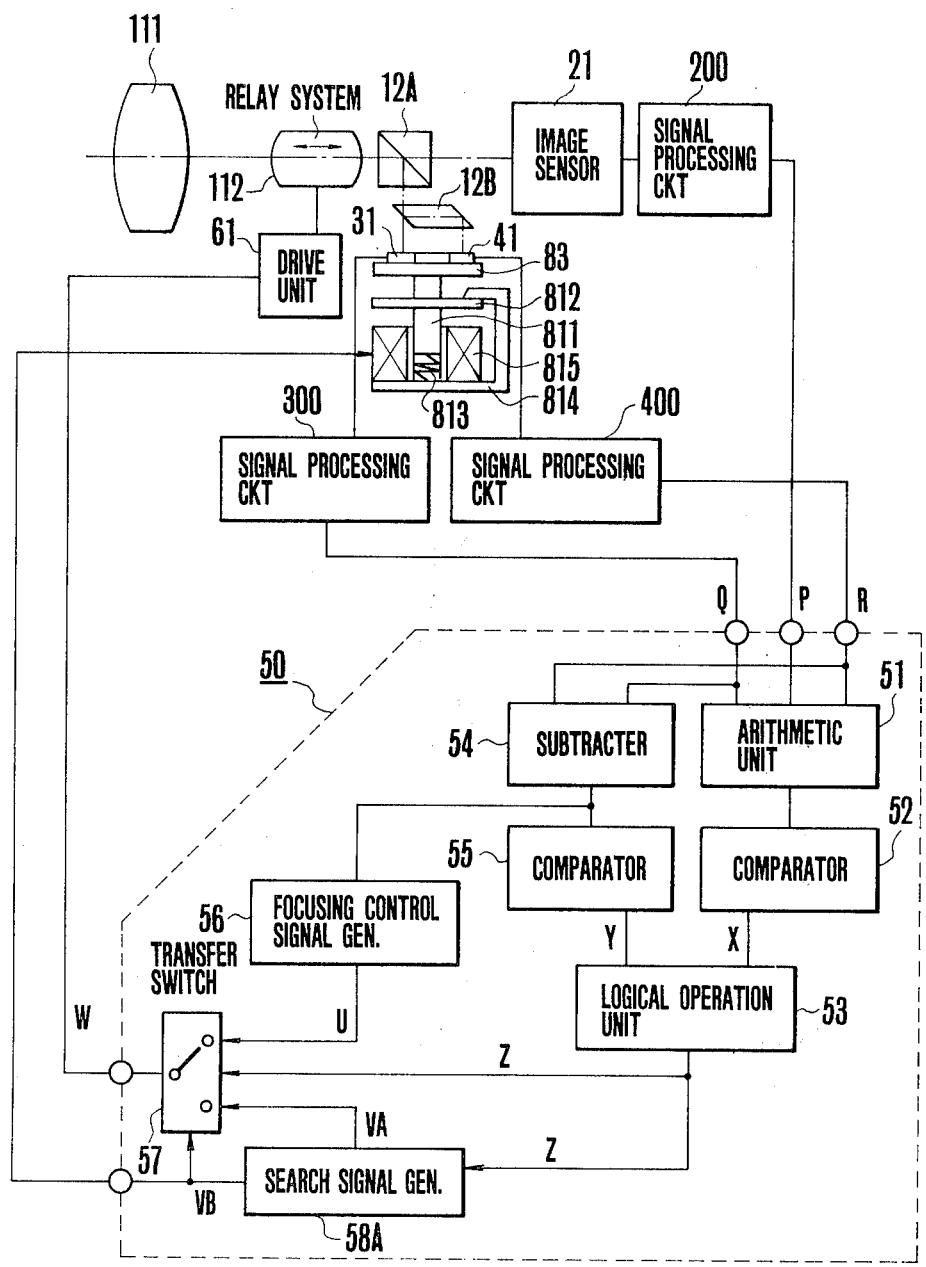
FIG. 7A is a block diagram showing another embodiment of the invention.

FIG. 7A illustrates yet another embodiment of the present invention as achieved in this respect. This embodiment differs from the embodiment of FIG. 2 in the following points:

(1) By use of the beam splitters 12A and 12B, one focussing beam is led to a sub-image sensor 31 and another focussing beam to a sub-image sensor 41, respectively.

(2) The sub-image sensors 31 and 41 are securely carried on a base 83, which is supported by a bottom member 814 through the medium of a movable shaft 811 and a spring 813. Further, a magnetic piece member 812 attached to part of the movable shaft 811 is attracted by the energization of a solenoid coil 815 and, as a result, the shaft 811, the base 83, and the two sub-image sensors 31 and 41 are integrally moved. The sub-image sensors are moved by the energization of the solenoid coil 815 to depart from the lens 112.

(3) To a search signal generator 58A is supplied the signal Z. Outputs VA, VB from this search signal generator 58A are fed to a transfer switch 57. The output VB also serves to energize the solenoid coil 815.

(4) The lens system is divided into a variable magnification system 111 and a relay system 112. The focussing operation of this system is effected by finely moving the relay system 112 in the direction of optical axis by means of a drive unit 61. This is one possible construction suggested for the convenience of illustration. Which lens system should be moved for the focussing is purely the matter of design of the system and has nothing to do with the fundamental principle of this invention.

(5) A signal processing circuit 200 in FIG. 7 collectively represents the signal processing circuit which is formed of the components 22 through 25 indicated in FIG. 2. Similarly circuits 300 and 400 shown in FIG. 7 correspond to the groups of components 32 through 34 and components 42 through 44 indicated in FIG. 2, respectively.

Now, the operation of the system according to this embodiment will be described. The operation of the system in the three states I, II, and III of the four states of Table 1 wherein Z=H is satisfied is identical with that already described in the embodiment of FIG. 2. When the state IV of Table 1 occurs, the system responds as follows. The signal Z to be fed to the search signal generator 58A changes from the H level to the L level immediately upon the occurrence of the state IV as described hereinbefore. This condition is indicated in the level change of the signal Z as shown at section (a) in a timing chart of FIG. 8. When this signal is supplied, the transfer witch 57 is switched so as to satisfy W=VA. Here, W stands for the output from the transfer switch 57. Then, the search signal generator 58A issues a search signal VB of a fixed time width as shown at section (b) in FIG. 8, which energizes the solenoid coil 815 to move the sub-image sensors 31, 41 in the direction for departure from the lens by a predetermined distance. Upon elapse of the fixed time required for this mechanical movement, the VB signal automatically returns to its original level and, consequently, the sub-image sensors 31, 41 also return to their respective original positions. The search signal VB is also fed to the transfer switch 57. The transfer switch 57 has a built-in inhibiting circuit which prevents the transfer switch 57 from admitting the signal Z while the search signal VB is retained therein for a fixed period.

Figure 7B:
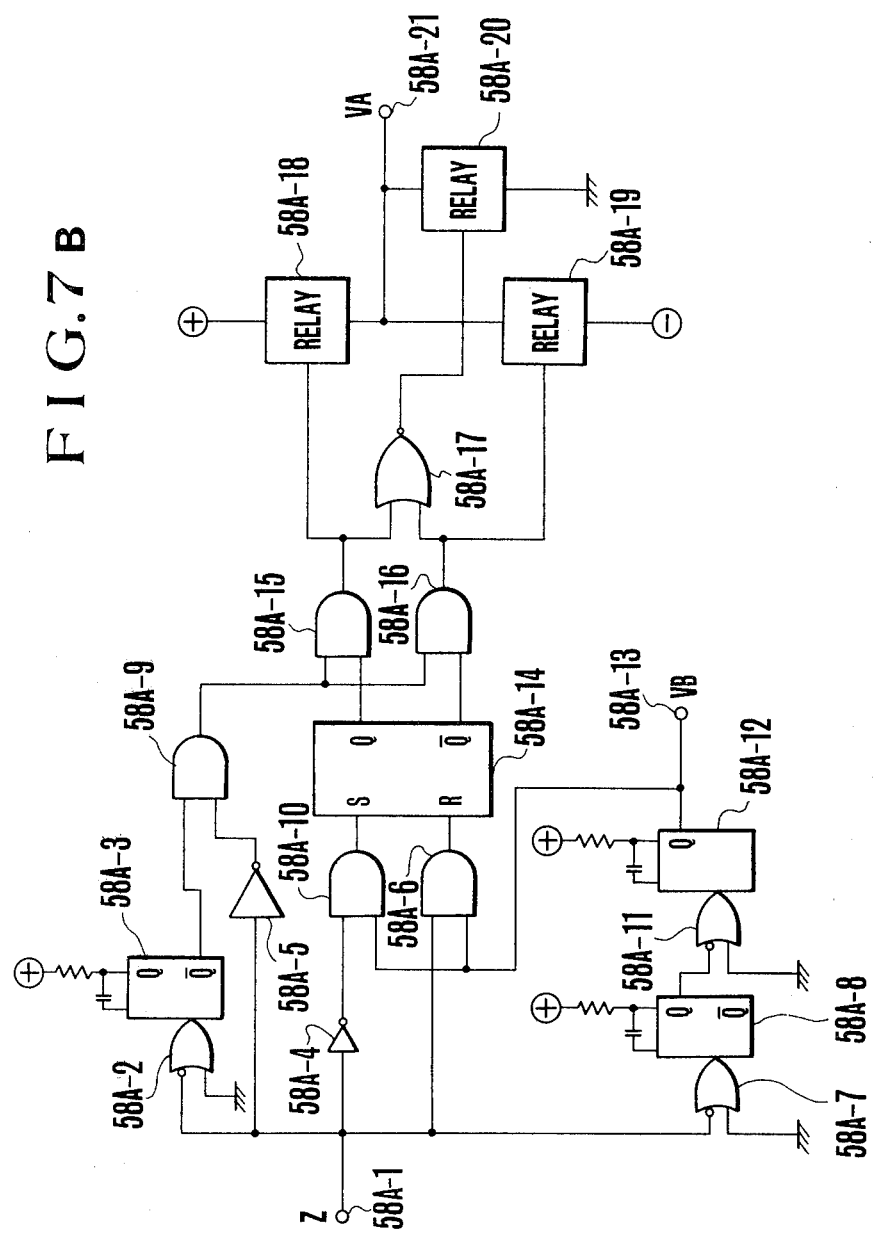
FIG. 7B is a circuit diagram showing an example of a search signal generator in the FIG. 7A embodiment.
Figure 7C:
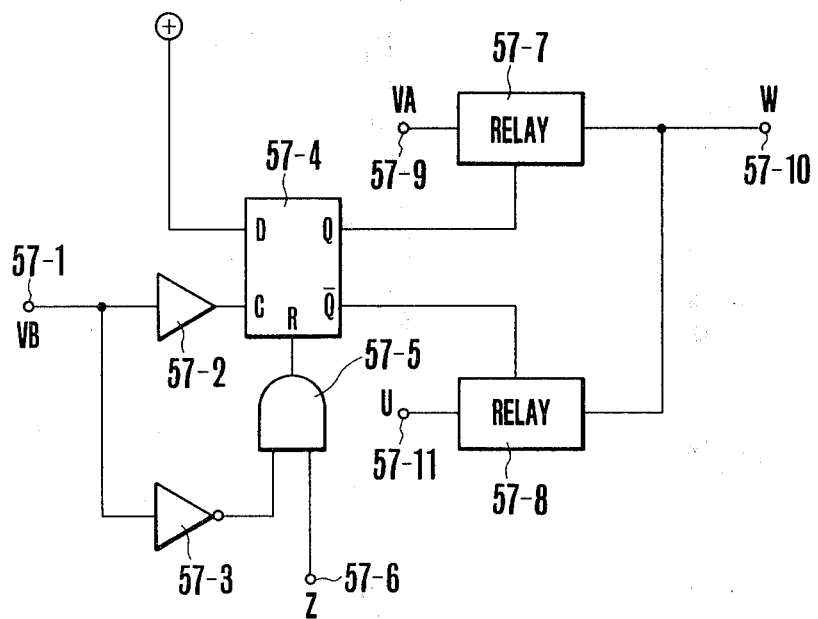
FIG. 7C is a circuit diagram showing an example of a transfer switch in the FIG. 7A embodiment.

The search signal generator 58A and the transfer switch 57 are exemplified as shown in FIGS. 7B and 7C.

In FIG. 7B, the search signal generator 58A has an input terminal 58A-1 for reception of the signal Z. Connected to this terminal 58A-1 are a monostable multivibrator 58A-3 having a duration $\tau_1$ via an OR gate 58A-2, inverters 58A-4 and 58A-5, one input of an AND gate 58A-6, and a monostable multivibrator 58A-8 having a duration of $\tau_2$ via an OR gate 58A-7. The monostable multivibrator 58A-3 has a $\overline{Q}$ output connected to one input of an AND gate 58A-9 with the other input connected to the output of the inverter 58A-5. The output of the inverter 58A-4 is connected to one input of an AND gate 58A-10. The other inputs of the AND gates 58A-6 and 58A-10 are connected in common. The monostable multivibrator 58A-8 has a Q output connected via an OR gate 58A-11 to a monostable multivibrator 58A-12 having a duration of $\tau_3$ which in turn is connected at its Q terminal to an output terminal 58A-13 for delivery of the signal VB and the common inputs of the AND gates 58A-6 and 58A-10. The OR gates 58A-2, 58A-7 and 58A-11 have respectively grounded inputs. The outputs of the AND gates 58A-10 and 58A-6 are respectively connected to a set terminal S and a reset terminal R of an SR flip-flop 58A-14 which has a Q output connected to one input of an AND gate 58A-15 and a $\overline{Q}$ output connected to one input of an AND gate 58A-16. The output of the AND gate 58A-9 is connected in common to the other inputs of the AND gates 58A-15 and 58A-16. The output of the AND gate 58A-15 is connected to one input of a NOR gate 58A-17 and an energization coil (not shown) of a relay 58A-18. Contacts (not shown) of the relay 58A-18 are connected between a positive pole of a DC power source (not shown) and an output terminal 58A-21 for delivery of the signal VA. Also, the output of the AND gate 58A-16 is connected to the other input of the NOR gate 58A-17 and an energization coil of a relay 58A-19. Contacts of this relay are connected between a negative pole of the DC power source and the output terminal 58A-21. The output of the NOR gate 58A-17 is coupled to an energization coil of a relay 58A-20 having contacts connected between the input terminal 58A-21 and ground.

Between durations of the monostable multivibrators 58A-3, 58A-8 and 58A-12, $\tau_1 > \tau_2 + \tau_3$ stands. The monostable multivibrators 58A-3, 58A-8 and 58A-12 are connected via given external circuits to the positive pole of the DC power source.

Reference is now made to FIG. 7C. The transfer switch 57 has an input terminal 57-1 for reception of the signal VB to which the inputs of a buffer amplifier 57-2 and an inverter 57-3 are connected. A D flip-flop 57-4 has a C terminal coupled to the output of the buffer amplifier 57-2 and a D terminal coupled to the positive pole of the DC power source. The output of the inverter 57-3 is connected to one input of an AND gate 57-5. This AND gate has the other input connected to an input terminal 57-6 for reception of the signal Z, with its output connected to an R terminal of the D flip-flop 57-4. This flip-flop has a Q output connected to an energization coil of a relay 57-7 and a $\overline{Q}$ output connected to an energization coil of a relay 57-8. While contacts of the relay 57-7 are connected between an input terminal 57-9 for reception of the signal VA and an output terminal 57-10 for delivery of the signal W, those of the relay 57-8 are connected between an input terminal 57-11 for reception of the signal U and the output terminal 57-10.

Obviously, the terminals 58A-1, 58A-13 and 58A-21 in FIG. 7B are respectively connected to the terminal 57-6, 57-1 and 57-9 in FIG. 7C.

The search signal generator 58A and the transfer switch 57 with the above constructions operate as will be described with reference to FIGS. 7B, 7C and 8. In the first place, when the signal Z applied to the input terminal 58A-1 is high, this signal is fed to one input of the AND gate 58A-10 via the inverter 58A-4 and directly coupled to one input of the AND gate 58A-6. On the other hand, the monostable multivibrator 58A-8, which is triggered by the fall of the signal Z, is not allowed to drive and hence the signal VB is not generated, thus disabling the AND gates 58A-10 and 58A-6. Accordingly, the Q and $\overline{Q}$ outputs of the SR flip-flop 58A-14 are indefinite. The monostable multivibrator 58A-2 is also not driven so that the AND gates 58A-15 and 58A-16 are both disabled to make the NOR gate 58A-17 produce a high level output. This high level output energizes the relay 58A-20. As a result, the signal VA at the output terminal 58A-21 assumes ground potential (section (d), FIG. 8).

Figure 8:
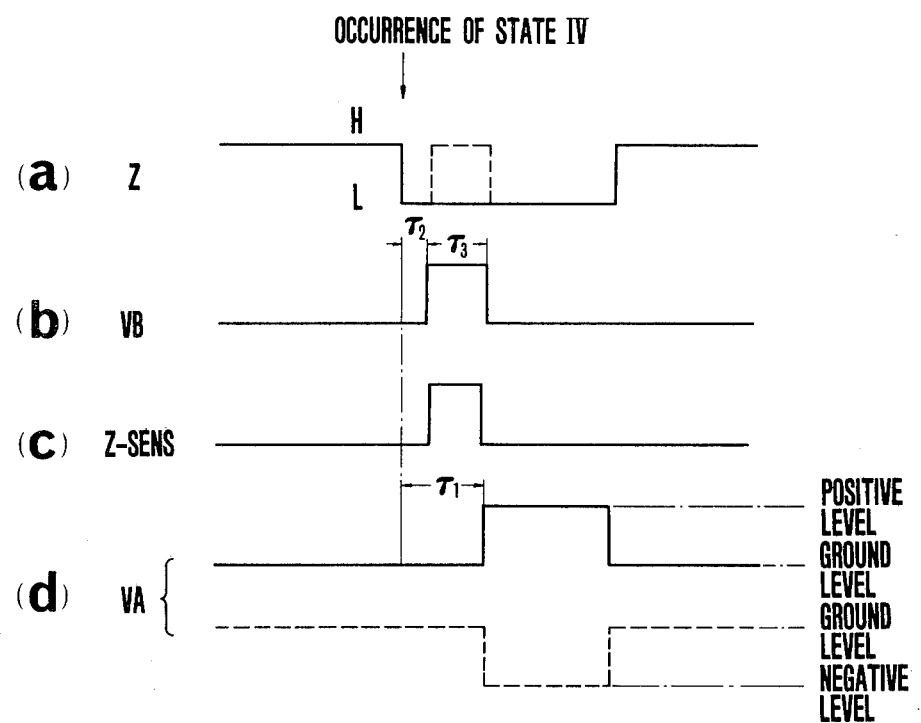
FIG. 8 is a diagram showing waveforms occurring in the system of the FIG. 7 embodiment.

Now, as shown at section (a) in FIG. 8, the signal Z changes from high to low and its fall triggers the monostable multivibrator 58A-8 to produce a pulse of duration $\tau_2$ at the Q terminal. The fall of this pulse then triggers the monostable multivibrator 58A-12 to produce a pulse of duration 3 at the Q terminal. As a result, the signal VB having the duration $\tau_3$ (section (b), FIG. 8) is obtained at the termination of the duration $\tau_2$ following the fall of the signal Z. This signal VB is coupled to the common inputs of the AND gates 58A-10 and 58A-6. The monostable multivibrator 58A-3 is also triggered by the fall of the signal Z to produce a low level output signal of duration $\tau_1 (> \tau_2 + \tau_3)$ at the $\overline{Q}$ terminal.

Under the above conditions, the operation is carried out as follows when the signal Z is held at low level. This signal Z is inverted by the inverter 58A-4 and applied to one input of the AND gate 58A-10 to enable the same. Accordingly, the SR flip-flop 58A-14 is set and a high level signal is generated from the Q output. Thus, it follows that when the AND gate 58A-15 is enabled at the termination of the duration $\tau_1$, a high level output of the AND gate 58A-15 energizes the relay 58A-18 and the output terminal 58A-21 is connected to the positive pole of the DC power source to ensure that positive VA signal as shown by a solid line at section (d) in FIG. 8 can be obtained. Concurrently therewith, the relay 58A-20 is deenergized. The AND gate 58A-6, on the other hand, is disabled to thereby prevent the generation of a high level signal at the $\overline{Q}$ output of the SR flip-flop 58A-14.

Incidentally, during the movement of the sub-image sensor by the signal VB or Z-SENS (at section (c), FIG. 8), it sometimes happens that the signal Z assumes the high level as shown by a dotted line at section (a) in FIG. 8. Under this condition, the AND gate 58A-10 is disabled and instead, the AND gate 58A-6 is enabled to reset the SR flip-flop 58A-14. Consequently, the Q terminal issues a high level signal which in turn enables the AND gate 58A-16, thereby energizing the relay 58A-19. The relay 58A-20 is simultaneously deenergized. In this manner, a negative VA signal as shown by a dotted line at section (d) in FIG. 8 is obtained at the output terminal 58A-21 which is now in connection to the negative pole of the DC power source.

Next, the operation of the transfer switch 57 responsive to the thus obtained signals VA and VB will be described. The operation of the D flip-flop 57-4 itself will be explained briefly in advance. As well known in the art, in the D flip-flop, when its R terminal assumes a high level, its Q and $\overline{Q}$ terminals are forcibly set to a low level and a high level, respectively. On the other hand, for the R terminal assuming a low level, information at the D terminal is produced from the Q terminal in response to the change from low to high at the C terminal.

When the signal Z as applied to the input terminal 57-6 is high and the signal VB at the input terminal 57-1 is low, the AND gate 57-5 is enabled to bring the R terminal of the D flip-flop to a high level, so that the low level signal occurring at the Q terminal deenergizes the relay 57-7 and the high level signal occurring at the $\overline{Q}$ terminal energizes the relay 57-8. As a result, the signal U at the input terminal 57-11 is coupled to the output terminal 57-10 to thereby establish W=U.

Next, when the signal Z is low and the signal VB is high, the R terminal of the D flip-flop changes to assume the low level and at the same time the terminal C changes from low to high, so that the Q terminal assumes the high level corresponding to the positive pole of the DC power source. This high level signal representative of the information at the D terminal energizes the relay 57-7 and the signal VA generated from the search signal generator 58A is fed to the output terminal 57-10. Concurrently, the relay 57-8 is opened.

Further, when the signal Z assumes the high level synchronously with the signal VB as shown by a dotted line at section (a) in FIG. 8, the R terminal of the D flip-flop becomes low, and the relay 57-7 is closed along with opening of the relay 57-8 to connect the negative VA signal as shown by a dotted line at section (d) in FIG. 8 to the output terminal 57-10.

Figure 9:
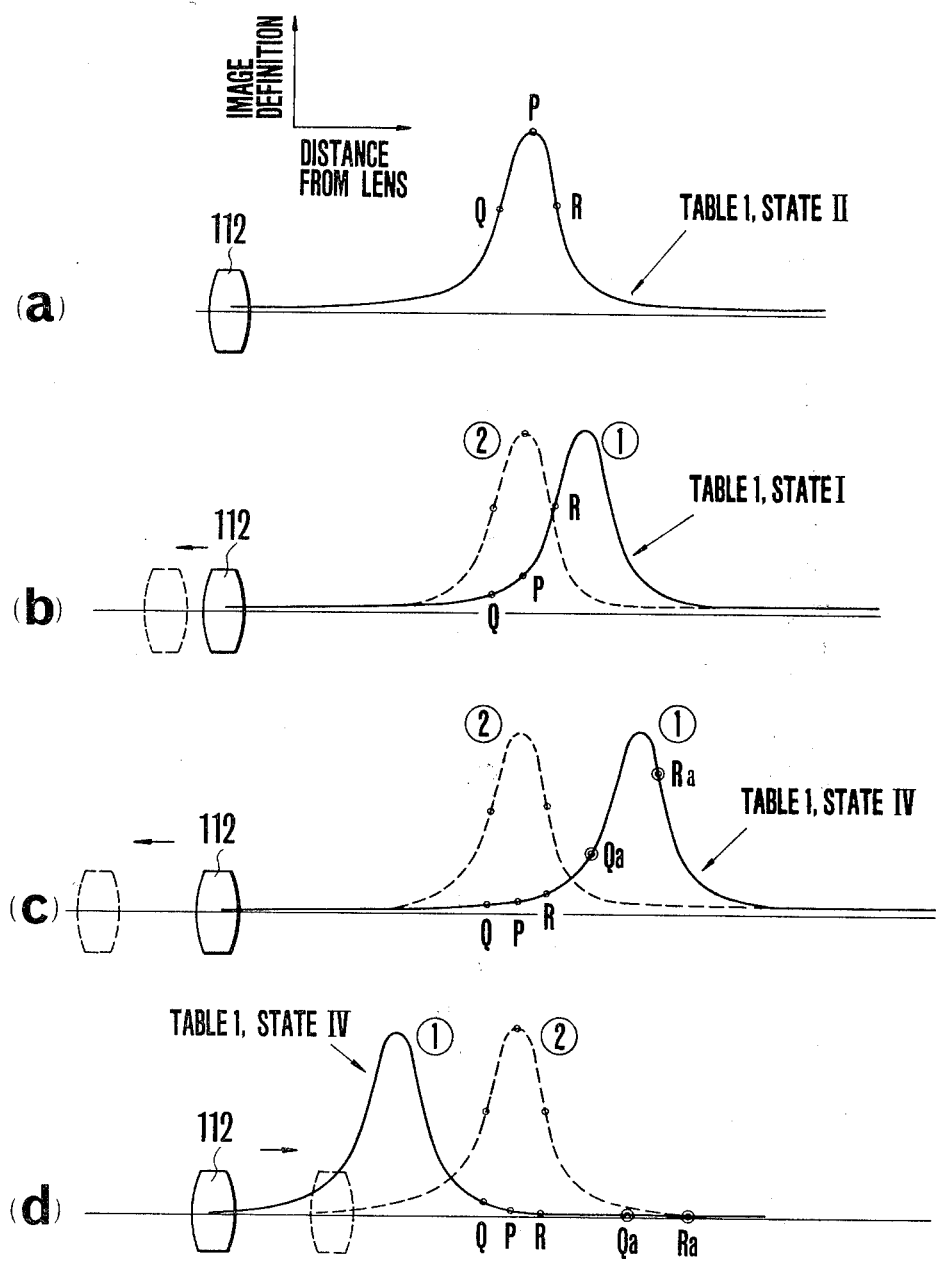
FIG. 9 is a diagram useful in explaining the operation of the FIG. 7 embodiment.

What sort of state ensues from the generation of the search signal VB will be described with reference to FIG. 9. As a preparatory for the description, the states in which the signal VB is not generated are illustrated in sections (a) and (b) in FIG. 9. FIG. 9 depicts at section (a) a correctly focussed state. The main image sensor signal P is taken from the peak point of the degree of image definition behind the lens 112 and the sub-image sensor signals Q and R are taken from the points before and after the peak point. This state corresponds to the state II of Table 1. As the object approaches the camera with the lens held in the state just described above, the curve of the degree of image definition moves backwardly as indicated by a curve ① of solid line indicated at section (b) in FIG. 9 and the positions of the main and sub-image sensors remain unchanged. Consequently, the signals P, Q, and R will assume a relation as illustrated and the state I of Table 1 will be realized. In this case, the autofocus operation of the system is effected in the same manner as already described in the embodiment of FIG. 2. As the result of the focussing operation, the lens 112 is pushed forward and brought to the position indicated by broken line and the curve of the degree of image definition is consequently moved to the position of a curve ② of broken line. Thus, the image definition signal P of the main image sensor will assume its maximum value. The operation described above is based on the same principle as that of the embodiment of FIG. 2. It portrays the focussing operation under the condition satisfying Z=H by way of illustration.

Now the description will proceed to the subject of main concern, i.e. the autofocus operation to be performed when Z=L is satisfied and the search signal VB is consequently issued. This situation corresponds to the state IV of Table 1. In this case, the main and sub-image sensors are extremely deviated from the peak point of the curve of image definition shown by solid line ① at section (c) in FIG. 9. Thus P≃Q≃R≃O is satisfied and the focussing signal is not allowed to occur. In this state, the two sub-image sensors are driven by the search signal VB in the direction for departure from the lens 112 as already described above. As a result, a signal $Q_a$ is obtained from the forward sub-image sensor 31 and a signal $R_a$ from the rearward sub-image sensor 41, respectively. In this state, the following relations are satisfied.

$F(P, Q_a, R_a) > a$, and $X = H$

Consequently, Z=H is satisfied is satisfied as is clear from Table 1. This state is indicated by a broken line in the signal Z of FIG. 8. Since the transfer switch 57 is prohibited by the search signal VB from receiving the signal Z, it does not produce any motion even when Z=H is satisfied. In other words, the switch retains its original state assumed so as to establish the condition W=VA (VA being shown at section (d) in FIG. 8) when Z=L is satisfied. Consequently, the signal of Z=H continues to occur until the VB signal automatically returns to its original level and the two sub-image sensors return to their original positions on lapse of the fixed period.

As indicated by a signal Z-SENS at section (c) in FIG. 8, the search signal generator 58A, by utilizing a fixed length of time included in the duration of the VB signal, checks if the condition Z=L has existed or the condition Z=H has been allowed to occur in that time interval. In the state described above, the condition Z=H did exist. If the condition Z=H exists, a negative signal VA as indicated by broken line at section (d) in FIG. 8 occurs after the search signal VB has ended. Since W=VA is satisfied, the negative voltage is fed to the lens drive unit 61 and the lens 112 is pushed forward and advanced to the position indicated by a broken line at section (c) in FIG. 9. As a result, the curve ① of image definition also begins to move in the same direction as the movement of the lens 112.

Now that the search signal VB has already ended its life, the transfer switch 56 begins to admit the signal Z. The sub-image sensors have already returned to their original positions and the original state of Z=L under the condition of P≃Q≃R≃O has already been resumed. By this time, the lens 112 has already started to advance forward under the cotrol of the signal VA, the signals P, Q, and R will be on the verge of reaching a sharply inclined part of the curve ① shown at section (c) in FIG. 9 on lapse of a certain length of time. Then, level differences occur in the three degrees of image definition P, Q, and R. At the moment that these level differences occur, the following conditions are assumed.

$F(P, Q, R) > a$ and $Z = H$

Consequently, the transfer switch 57 assumes the condition W=U and thereafter begins to be controlled by the focussing control signal U, and the lens 112 is moved to the correct focal position. Finally, it reaches the lens position indicated by broken line at section (c) in FIG. 9 and the position of the curve of image definition indicated by curve ② of broken line, bringing the focussing operation to completion.

The case in which the focal point deviates in the opposite direction from the case described above is depicted at section (d) in FIG. 9. In this case, the lens 112 focusses the object at the nearest position, whereas the actual object being photographed is positioned at the infinite distance. In this case, a curve ① of image definition is conspicuously deviated in the forward direction from the main and sub-image sensors. Consequently, the image definition signals P, Q, and R are invariably small and the condition Z=L exists. In this case, the positional relation between the main and sub-image sensors and the curve ① of image definitio is opposite to that existing in the case section (c) in FIG. 9. Therefore, the condition $P \simeq Q_a \simeq R_a$ and the condition Z=L remain intact even if the two sub-image sensors are moved in the direction for departure from the lens 112 by the ocurrence of the search signal VB. The level of the signal Z in this case is indicated by the solid line in FIG. 8. When the level of the signal Z is detected by the signal Z-SENS during the existence of the VB signal, the result of Z=L is obtained throughout this duration. The VA signal which is consequently generated, therefore, has the polarity of plus as indicated by the solid line of FIG. 8. In this case, the lens 112 is drawn in toward the rear and, consequently, the curve ① of image definition is moved backwardly. On lapse of a certain length of time, level differences occur among the signals P, Q, and R. At that time, the condition Z=H is assumed. After this point, the focussing operation is brought to completion through the course already described.

In this embodiment, the lengths of light path to the lens 112 are varied by moving the sub-image sensors 31, 41. The same object may be accomplished by some other methods. In a modification illustrated in FIG. 10, for example, the insertion of a biconvex lens 12C in the light path running from one beam splitter 12A to the other beam splitter 12B brings about substantially the same effect as that obtained by moving sub-image sensors 31, 41 backwardly. When the biconvex lens 12C is slid back to the position indicated by the broken line in FIG. 10, the sub-image sensors 31, 41 return to their original optical positions. The mechanism for the movement of the biconvex lens 12C may be the same as the mechanism for the movement of the sub-image sensors in the embodiment of FIG. 7. A similar effect can be obtained by inserting a biconcave lens or a flat glass plate in the light path running between the beam splitters 12A and 12B. The essential requirement in this case is that the lengths of light path from the lens 112 to either or both of the sub-image sensors 31, 41 should be varied.

Figure 10:
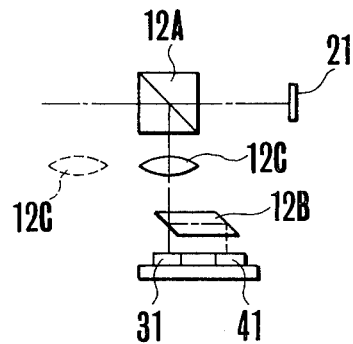
FIG. 10 is a block diagram showing a modification of the FIG. 7 embodiment.

In the embodiments of FIG. 7 and FIG. 10, the extents to which the lengths of light path are varied should be large enough so that any variations of light path made within the fixed range will produce detectable changes in the signals Q and R.

As described above, the system of the present invention is characterized by permitting the focussing to be effected with high accuracy without being appreciably affected by the kind, position, luminance, contrast, and movement of the object being photographed. Thus, the system is highly useful as a focussing device in the television camera.

Figure 11:
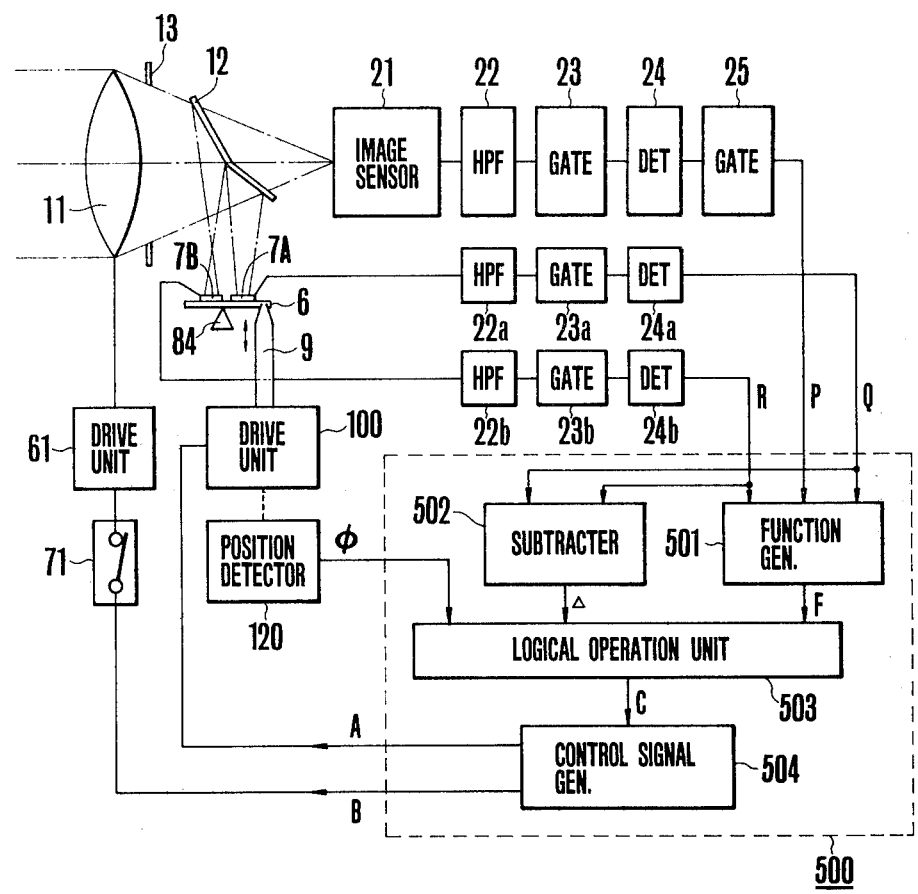
FIG. 11 is a block diagram showing still another embodiment of an autofocus system according to the invention.

FIG. 11 is a block diagram showing yet another embodiment of the invention. As shown, on the light path of a camera lens 11 constituting an image-forming optical system, there are disposed an aperture 13, a centrally bent beam splitter 12, and a main image sensor 21. On the side of the light path separated by the beam splitter 12, there are disposed sub-image sensors 7A, 7B which are spaced apart a predetermined distance from each other and carried on a base 6 adapted to swing on a fulcrum 84. The camera lens 11 is driven by a drive unit 61 to change the focal positions relative to the image sensors 21, 7A, and 7B. On the other hand, the base 6 is driven at one end thereof by a drive unit 100 through the medium of a transimission unit 9. Consequently, the angle of the base 6 relative to the beam splitter 12 is controlled and the directions of optical axes of the sub-image sensors 7A, 7B as viewed from the beam splitter 12 are accordingly changed.

As in the foregoing embodiments, the signal from the main image sensor 21 is processed through a series of circuits including a high-pass filter 22, a gate 23, a detector 24 and a gate 25 to provide a definition signal P, the signal from the sub-image sensor 7A is processed through a series of circuits including a high-pass filter 22a, a gate 23a and a detector 24a to provide a definition signal Q, and the signal from the sub-image sensor 7B is processed through a series of circuits including a high-pass filter 22b, a gate 23a and a detector 24b to provide a definition signal R. The signals P, Q and R are applied to a controller 500.

To the drive unit 100 is connected a position detector 120 which generates a position signal $\phi$ indicating the optical positions of the sub-image sensors 7A, 7B corresponding to the inclination of the base 6. The sub-image sensors 7A, 7B are moved in opposite directions by the control of the drive unit 100, i.e. one of the sensors is moved from the forward side of the focal point to the correct focussed state and the other from the rearward side of the focal point to the focussed state. The minimized distance between the two sensors as viewed from the beam splitter 12 is fixed at a length greater than the focal depth of the camera lens 11, specifically the distance being about 10 times the focal depth. In this connection, the swinging angle of the base 6 is limited so that this distance will not decrease below the minimized distance mentioned above. The arrangement of these parts is such that a position signal of $\phi_o$ will be issued when the distance is decreased to this minimum length.

A function generator 501 included in the controller 500 receives the definition signals P, Q and R to generate a function F defined as:

$$F(P,Q,R) \equiv (P-Q)^2 + (P-R)^2$$

A subtractor 502 calculates the differences between the signals Q and R, which is $\Delta(Q, R)$. A logical operation unit 503 judges the conditions as expressed by the formulae (1) and (2) in respect of F (P, Q, R) and $\Delta(Q, R)$.

The logical operation unit 503 issues a signal C which represents the result of the judgement described above. As a result, a control signal generator 504 issues control signals A, B. The various conditions in which the position signal $\phi$ from the position detector 120, the output F from the function generator 501, and the output from the subtractor 502 can occur as shown in terms of functions as classified by the states 1 through 5 in Table 2.

TABLE 2

| | state | | | | |
|---|---|---|---|---|---|
| | 1 | 2 | 3 | 4 | 5 |
| | F > a | F ≦ a | F ≦ a | | |
| | Δ > b | Δ > b | Δ ≦ b | F > a | F > a |
| | φ: | φ: | φ: | Δ ≦ b | Δ ≦ b |
| output | arbitrary | arbitrary | arbitrary | φ = φ$_o$ | φ = φ$_o$ |
| Output A | O | O | H | L | O |
| Output B | Q − R | Q − R | O | O | O |

In Table 2, H and L are binary logic values and L assumes a negative signal when H assumes a positive signal, for example.

As a whole, therefore, the following control operation is actually carried out.

Figure 12:
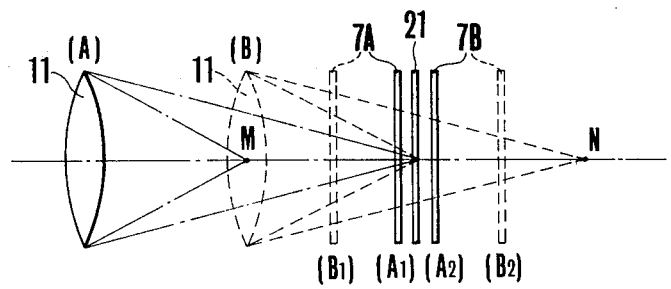
FIG. 12 is a diagram showing the optical relation of the camera lens and the image sensor.

The equivalent optical relation between the camera lens 11 and the image sensors 21, 7A, and 7B is illustrated in FIG. 12. Assume that the camera lens 11 moves from a position (A) to a position (B) and the distance between the sub-image sensors 7A and 7B is minimum when the lens is at position (A) and maximum at position (B). When the lens is at position (A), an object at the smallest distance is focussed on the surface of the main image sensor 21 and an object at the infinite distance is focussed at a point M. If the camera lens 11 is moved to position (B), the object at the infinite distance is focussed on the surface of the main image sensor 21 and the object at the smallest distance is focussed at a point N. Thus, any object falling between the smallest distance and the infinite distance is focussed at a point between the point M and the point N irrespective of the position of the camera lens 11.

If, in this case, the object is correctly focussed on the surface of the main image sensor 21, then the definition signal P assumes a maximum value to satisfy the relation Q=R<P. Consequently, the following conditions are satisfied.

$$F(P, Q, R) \equiv (P - Q)^2 + (P - R)^2 > a \\ \Delta(Q, R) \equiv |Q - R| \leq b \quad \Bigg\} \quad (11)$$

Thus, state 4 or state 5 in Table 2 is realized. If, in this case, the condition φ=φ$_o$ is satisfied, namely if the distance between the sub-image sensors 7A and 7B is minimum, the relation A=B=O occurs. In state 5, therefore, the control signals A and B are both O. Consequently, drive units 100, 61 to which these control signals are supplied directly or indirectly via a manual transfer switch 71 are stopped.

If the state 4 is assumed under general condition φ=φ$_o$ and the camera lens 11 is stopped because of the condition B=O, the drive unit 100 is controlled under the condition A=L and the sub-image sensors 7A and 7B are driven in the direction of decreasing the distance therebetween. After the condition φ=φ$_o$ is assumed, they are stopped because of the state V.

In contrast, in the incorrectly focussed state, the state 1 or state 2 is assumed and the system performs various operations but ultimately the state 5 is assumed and the system is stopped through the course described below.

It is now assumed that the sub-image elements 7A and 7B are positioned at positions (A1) and (A2) and the object is focussed near the sub-image sensor 7A. In this case, since the focussed state occurs in a rather forward position, the relation Q>P>F occurs and the differences between them are large. Thus, the following relations are satisfied.

$$F > a \text{ and } \Delta > b \quad (12)$$

Consequently, the state 1 is realized and the distance between the sub-image sensors 7A and 7B remains unchanged because of the condition A=O. The camera lens 11, however, is controlled by the condition B=Q−R and is moved in the direction of position (B) because of the condition (Q−R)>O.

As a result, the focal point is also moved to the right in the diagram. At the time that the focal point coincides with the surface of the main image sensor 21, there is assumed the state 4 or the state 5. The system stops when the focussed state is reached through the course mentioned above.

In case where the sub-image sensors 7A and 7B are disposed in the same manner and the focal point falls near the sub-image sensor 7B at position (A2), the conditions of formula (12) holds good but the condition B=Q−R<O exists. Consequently, the camera lens 11 is controlled in the direction from (B) to (A) and the focal point stops at the time that it coincides with the surface of the main image sensor 21.

In the state 2 and the state 3, the condition F≦a, namely, the condition P≃Q≃R exists. This condition signifies that the sub-image sensors 7A and 7B are at positions (A1) and (A2) and the focal point is near the point M or the point N. In this case, there occur two possibilities.

To be specific, the first possibility exists under the condition Δ(Q R)>b. This is when there is detected a discernible difference, through only slight, between the definition signals Q and R. In this case, the state 2 is assumed and the camera lens 11 is controlled in the correct direction and moved to the correct focal position under the condition B=Q−R.

The second possibility occurs under the condition Δ(Q, R)≦b which corresponds to the state 2. In this case, there is a conspicuous deviation from the correctly focussed state and there occurs no discernible difference between the definition signals P, Q, and R, rendering the control operation impracticable. The control of the camera lens 11 is stopped because of the condition B=O and the distance between the sub-image sensors 7A and 7B is controlled instead by the condition A=H. Contrary to the state 4, their distance is increased to positions (B1) and (B2).

Consequently, one of the sub-image sensors 7A and 7B approaches the focal point in the neighborhood of the point M or the point N to satisfy the condition Δ>b, with the result that the state 1 or the state 2 is realized and the correctly focussed state is approached through the course described above.

It must be noted, however, that in this case, the accuracy of correct focussing is degraded if the distance between the sub-image sensors 7A and 7B is large. In other words, when the correctly focussed state is obtained at the main image sensor 21 and the definition signals Q and R are compared by the sub-image sensors 7A and 7B, the desirability of the results of the comparison to be obtained for a slight error of the focussing increases in proportion as the distance between the two sensors decreases.

A fairly large error of focussing occurs as described above when the distance between the sub-image sensors 7A and 7B is large. This fact signifies that the state 4 has been reached. When the distance begins to decrease under the condition A=L and the difference between the definition signals Q and R is detected, the state 4 shifts to the state 1. Consequently, the change of the distance is temporarily stopped and the position of the camera lens 11 is controlled by the condition B=Q−R, with the fine adjustment of the focal point contnued until the difference between Q and R is not detected. Then, the condition Δ≦b occurs and the state 1 again shifts to the state 4. The procedure described above is repeated until the final convergence to the state 5 occurs.

FIG. 13 is a block diagram showing yet another embodiment of this invention. In this case, a beam splitter 12 used in the system has a flat surface. Besides, there is used only one sub-image sensor 7 which can reciprocate along a light path 110. This sub-image sensor is driven by a drive unit 100. At a position (C1), the sub-image sensor 7 assumes a forward position and a definition signal Q is generated. At a position (C2), the sub-image sensor 7 assumes a rearward position and a definition signal R is generated. The two signals Q and R are alternately selected by a selector 310 which is controlled in accordance with the operation of the drive unit 100, and the selected signal is supplied to a controller 500.

Consequently, the focussing control is effected by the same operation as in the embodiment of FIG. 11. In this embodiment, however, the reciprocation of the sub-image sensor 7 is controlled by a control signal A. A signal corresponding to that control signal is issued as a position signal φ from a position detector 120. In the embodiments of FIGS. 11 and 13, as regards the relation between the main image sensor 21 and the sub-image sensors 7, 7A, and 7B, it is desirable to dispose the main image sensor 21 optically at the center and the sub-image sensors 7A and 7B equidistantly forward and rearward from that center or allow the sub-image sensor 7 alone to be moved forward and rearward from the center by the same distance, in order that the main image sensor 21 autoamtically assumes the correctly focussed state under the condition Q=R.

When the condition of the equal distance mentioned above is not fulfilled, the state in which the correct focussing is obtained under the condition Q=R can be electrically obtained by adjusting the gains in the circuits for the outputs Q and R from the sub-image sensors 7, 7A, and 7B.

What is claimed is:

1. In an autofocus system in which the image definition of an object to be picked up is detected by image sensor means disposed on a light path of an image-forming optical system and converted into electric signals, and the image-forming position of the image-forming optical system is controlled by using the electric signals, the improvement wherein said autofocus system comprises:

a main image sensor and at least one sub-image sensor disposed in a predetermined optical positional relationship with the main image sensor, said main and sub-image sensors being used as said image sensor means;

means connected to said main image sensor and sub-image sensor, for converting the image definition from each of the sensors into an electric signal;

control means for judging the focussed state of said image-forming optical system by a predetermined arithmetic operation performed on at least said electric signals and generating, in accordance with the results of said judgement, a control signal for adjustment of at least the image-forming position of said image-forming optical system;

a beam splitter disposed between said image-forming optical system and said main image sensor;

a single sub-image sensor for reception of separated light from the splitter provided movably along said light path; and electric signals representative of different image definitions generated at different positions of the sub-image sensor;

whereby the image-forming position of the image-forming optical system is controlled by said control signal.

2. In an autofocus system in which the image definition of an object to be picked up is detected by image sensor means disposed on a light path of an image-forming optical system and converted into electric signals, and the image-forming position of the image-forming optical system is controlled by using the electric signals, the improvement wherein said autofocus system comprises:

a main image sensor and at least one sub-image sensor disposed in a predetermined optical positional relationship with the main image sensor, said main and sub-image sensors being used as said image sensor means;

means connected to said main image sensor and sub-image sensor, for converting the image definition from each of the sensors into an electric signal;

control means for judging the focussed state of said image-forming optical system by a predetermined arithmetic operation performed on at least said electric signals and generating, in accordance with the results of said judgement, a control signal for adjustment of at least the image-forming position of said image-forming optical system;

a beam splitter disposed between said image-forming optical system and said main image sensor;

a first sub-image sensor provided movably along a light path of separated light from the splitter at an optically forward position with respect to said main image sensor; and a second sub-image sensor provided movably along the light path of the separated light at an optically rearward position with respect to said main image sensor;

whereby the image-forming position of said image-forming optical system and the movement of said sub-image sensors are controlled by said control signal.

3. In an autofocus system in which the image definition of an object to be picked up is detected by image sensor means disposed on a light path of an image-forming optical system and converted into electric signals, and the image-forming position of the image-forming optical system is controlled by using the electric signals, the improvement wherein said autofocus system comprises:

a main image sensor and at least one sub-image sensor disposed in a predetermined optical positional relationship with the main image sensor, said main and sub-image sensors being used as said image sensor means;

means connected to said main image sensor and sub-image sensor, for converting the image definition from each of the sensors into an electric signal;

control means for judging the focussed state of said image-forming optical system by a predetermined arithmetic operation performed on at least said electric signals and generating, in accordance with the results of said judgement, a control signal for adjustment of at least the image-forming position of said image-forming optical system;

a beam splitter disposed between said image-forming optical system and said main image sensor;

first and second sub-image sensors for reception of separated light from the splitter mounted on a swingable base, wherein said control means receives a signal representative of the swinging position of said first and second sub-image sensors in addition to said electric signals; and whereby the image-forming position of said image-forming optical system and the swinging motion are controlled by said control signal.

4. In an autofocus system in which the image definition of an object to be picked up is detected by image sensor means disposed on a light path of an image-forming optical system and converted into electric signals, and the image-forming position of the image-forming optical system is controlled by using the electric signals, the improvement wherein said autofocus system comprises:

a main image sensor and at least one sub-image sensor disposed in a predetermined optical positional relationship with the main image sensor, said main and sub-image sensors being used as said image sensor means;

means connected to said main image sensor and sub-image sensor, for converting the image definition from each of the sensors into an electric signal;

control means for judging the focussed state of said image-forming optical system by a predetermined arithmetic operation performed on at least said electric signals and generating, in accordance with the results of said judgement, a control signal for adjustment of at least the image-forming position of said image-forming optical system;

a beam splitter disposed between said image-forming system and said main image sensor; and a single sub-image sensor for reception of separated light from the splitter provided movably along said light path to generate electric signals representative of different image definitions at different positions, wherein said control means also receives a signal representative of the position of the movement;

whereby the image-forming position of said image-forming optical system and the movement of said sub-image sensor are controlled by said control signal.

5. In an autofocus system in which the image definition of an object to be picked up is detected by image sensor means disposed on a light path of an image-forming optical system and converted into electric signals, and the image-forming position of the image-forming optical system is controlled by using the electric signals, the improvement wherein said autofocus system comprises:

a main image sensor and at least one sub-image sensor disposed in a predetermined optical positional relationship with the main image sensor, said main and sub-image sensors being used as said image sensor means, wherein a peripheral portion of the main image sensor is used as the sub-image sensor;

means connected to said main image sensor and sub-image sensor, for converting the image definition from each of the sensors into an electric signal;

control means for judging the focussed state of said image-forming optical system by a predetermined arithmetic operation performed on at least said electric signals and generating, in accordance with the results of said judgement, a control signal for adjustment of at least the image-forming position of said image-forming optical system; and a beam splitter disposed between said image-forming optical system and said main image sensor, and said sub-image sensor receives separated light from the splitter through a sub-optical system, wherein said sub-optical system is movable along its optical axis.

* * * * *